United States Patent [19]

Akaba et al.

[11] Patent Number: 4,882,554

[45] Date of Patent: Nov. 21, 1989

[54] MULTI-DROP TYPE BUS LINE SYSTEM

[75] Inventors: Yukio Akaba, Chiba; Akihiko Sakuramoto, Tokyo, both of Japan

[73] Assignees: Sony Corp.; SMK Co., Ltd., both of Tokyo, Japan

[21] Appl. No.: 197,980

[22] Filed: May 24, 1988

[30] Foreign Application Priority Data

May 29, 1987 [JP] Japan .................... 62-135541

[51] Int. Cl.$^4$ .......................... H03H 7/38
[52] U.S. Cl. ................ 333/105; 200/51.1; 333/22 R
[58] Field of Search .......... 333/105, 124, 22 R; 439/43; 200/51.1

[56] References Cited

U.S. PATENT DOCUMENTS

| 3,525,056 | 8/1970 | Qurashi | 333/22 R |
| 3,529,264 | 9/1970 | Lancaster | 333/124 X |
| 3,692,966 | 9/1972 | Lancaster | 200/51.1 |
| 4,429,384 | 1/1984 | Kaplinsky | 370/85 |
| 4,507,627 | 3/1985 | Ito et al. | 333/105 |

Primary Examiner—Paul Gensler
Attorney, Agent, or Firm—Ronald P. Kananen

[57] ABSTRACT

A multi-drop type bus line system having a plurality of terminals respectively connected to a common bus line, in which each terminal has a connector interconnecting with the other terminals and the connectors at the respective terminals are interconnected by means of a connection cable. Each connector is provided with a switch which is actuated each time the connection cable is coupled to the connector of the terminal, whereby when the connection cable is coupled to the connector, the switch releases an impedance matching resistor connected between predetermined terminal pins of the connector. Impedance matching is improved and standing waves are reduced.

21 Claims, 7 Drawing Sheets

MULTI-DROP TYPE BUS LINE SYSTEM

BACKGROUND OF THE INVENTION

1. Field of the Invention

The present invention relates generally to multi-drop type bus line system. More particularly, this invention relates to impedance matching a transmission line and a load in a multi-drop bus line system for transmitting a control signal. Still more particularly, this invention relates to a connector for a terminal in such a system, wherein the connector includes a switch actuated each time a cable is attached to the connector to alter the impedance of the terminal.

2. Description of the Prior Art

A so-called multi-drop type bus line system is known in which a plurality of terminals operable asychronously with one another are connected to the same information bus line. Information is interchanged among the respective terminals through the information bus line. The information might be transmitted and/or received in the form of a differential signal in order to increase the ability of the system to cope with noise, as is disclosed, for example, in U.S. Pat. No. 4,429,384.

FIG. 1 illustrates an example of the bus structure of such a conventional multi-drop type bus line system.

In this example, representative terminals (n−1), (n), (n+1) and (n+2) are connected to the same bus line BL as shown in FIG. 1. When the characteristic impedance of a bus line and an impedance of a load connected to the bus line are different in a communication system using such an information bus line, a standing or reflected wave occurs so that waveform distortion occurs. To avoid this shortcoming, an impedance matching circuit is frequently connected to the terminal portion of the bus line.

A method is also known which can prevent the standing wave from being produced by inserting the terminal impedance into a transmission line such as a feeder, a coaxial cable or the like, through which a high frequency signal is transmitted. However, such a technique is not sufficiently developed that the occurrence of the standing wave can be prevented in the information or bus line through which the above-mentioned information signal is transmitted.

Thus, it is a continuing problem in the art to provide simple and convenient impedance matching in a common bus system having many terminals, to prevent standing waves.

OBJECTS AND SUMMARY OF THE INVENTION

Accordingly, it is an overall object of the present invention to provide an improved multi-drop type bus line system.

It is another object of the present invention to provide a multi-drop type bus line system having a multi-drop type bus line through which a control signal is transmitted with a terminating impedance which is automatically inserted to prevent the occurrence of a standing wave.

According to an aspect of the present invention, a multi-drop type bus line system comprises (a) a plurality of terminals, each having first and second connectors, each of the first and second connectors having a predetermined number of connection pins, wherein corresponding connection pins of the first and second connectors are electrically connected and the connection pins are electrically connected to a circuit provided within each of the plurality of terminals;(b) connection cable means for coupling the connector of one terminal to the connector of the another terminal to enable signal transmissions between the predetermined terminals; (c) switching means provided in the connector of each terminal, which is operated each time the connection cable means is coupled to the connector; (d) interline impedance means, such as a resistor, connected between predetermined connection pins of the first and second connectors; and (e) means for affecting, by the actuation of the switching means, the interline impedance means when the connection cable means is coupled to the connector by the action of the switching means.

According to another aspect of the present invention, there is provided an apparatus for forming a multi-drop type bus line system comprising: (a) a plurality of apparatuses, each having first and second connectors, each of the first and second connectors having a predetermined number of connection pins, wherein corresponding connection pins of the first and second connectors are electrically connected and the connection pins are respectively electrically connected to a circuit provided within each of the plurality of apparatuses; (b) connection cable means for coupling the connector of one apparatus to the connector of another apparatus; (c) switching means, provided in the connector of each apparatus, which is actuated each time the connection cable means is coupled to the connector; (d) interline impedance means, such as a resistor, connected between predetermined connection pins of the first and second connectors; and (e) means for releasing the interline impedance means when the connection cable means is connected to the connector, wherein the apparatus are coupled through the connection cable to form the multi-drop type bus line system and impedance matching is effected at a terminated portion of the bus line.

According to still another aspect of the present invention, there is provided a connector comprising: (a) a predetermined number of connection pins; (b) a switch which is operated each time a connection cable for coupling the connector to another connector is inserted into the connector; (c) interline impedance means, such as a resistor, connected between predetermined connection pins of the connector; and (d) means for releasing the interline impedance means when the connection cable is inserted into the connector by the action of the switch.

These and other features of the invention will become apparent from a detailed description of the invention which follows.

BRIEF DESCRIPTION OF THE DRAWINGS

A better understanding of the objects, features and advantages of the invention can be gained from a consideration of the following detailed description of the preferred embodiment thereof, in conjunction with the figures of the accompanying drawings, wherein.

DETAILED DESCRIPTION OF THE PREFERRED EMBODIMENT

The present invention will now be described with reference to FIGS. 2 to 10.

Figure 1:
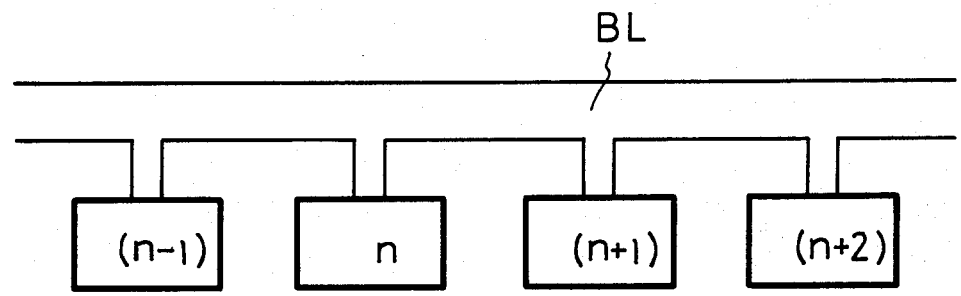
FIG. 1 is a schematic representation of a conventional multi-drop type bus line system.
Figure 2:
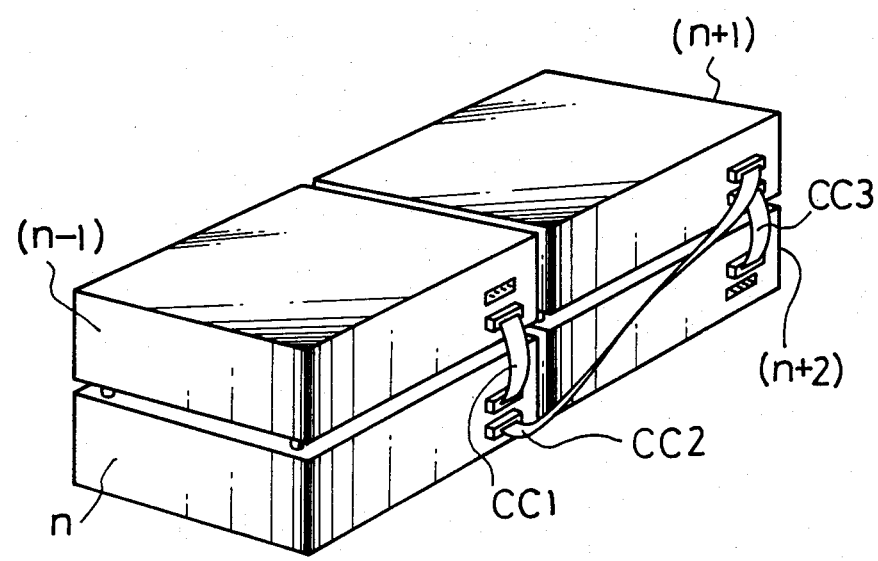
FIG. 2 is an illustration of a multi-drop type bus line system which is formed by connecting respective terminals in a system such as is shown in FIG. 1.

FIG. 2 shows a rear side of each terminal of the type representatively shown connected to a multi-drop bus line BL in FIG. 1. In this embodiment, "terminals" mean electronic apparatuses which employ a common bus line to transmit and/or receive a signal among the apparatuses. By way of example, in the audio equipment field, a "terminal" may be a tuner, an amplifier, a tape recorder, or the like. In the video equipment field, a "terminal" may be a television receiver, a video tape recorder, or the like.

In FIG. 2, four representative terminals (n−1), (n), (n+1) and (n+2) are together connected. Each of the terminals has an upper and a lower connector for respectively coupling the terminals. A lower connector of the terminal (n−1) and an upper connector of the terminal n are coupled to each other by means of a connection cable CC1. A lower connector of the terminal n and an upper connector of a terminal (n+1) are similarly coupled to each other by means of a connection cable CC2. The lower connector of the terminal (n+1) and an upper connector of a terminal (n+2) are coupled to each other by means of a connection cable CC3. Thus, the terminals (n−1), (n), (n+1) and (n+2) are connected to a common bus line BL, to form a so-called multi-drop type bus line system.

Figure 3:
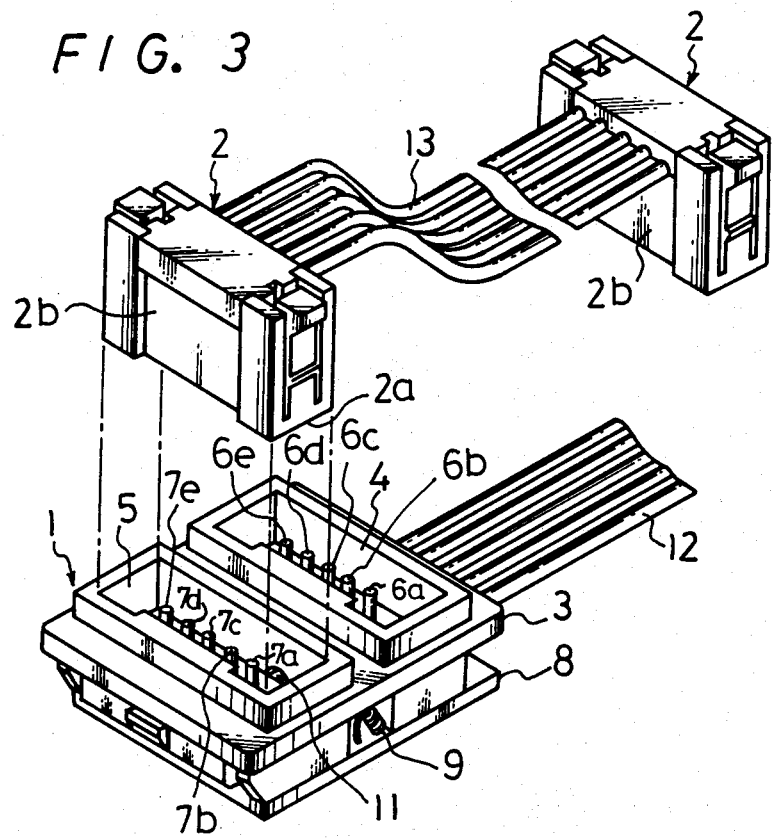
FIG. 3 is a perspective view of a connector secured to each terminal, such as is shown in FIG. 2.

FIG. 3 is a perspective representation of each of the connectors provided at the rear of the respective terminals (n−1), (n), (n+1) and (n+2) for coupling the terminals to one another as shown in FIG. 2, and each of the connection cables coupled to a representative pair of connectors.

As shown in FIG. 3, a connector includes a connector socket 1 and a connector plug 2, respectively. The connector socket 1 has connection openings 4 and 5, each having a rectangular configuration formed on one side, i.e. a first side, of a connector socket base 3. The connector plug 2 can be inserted into either one of the connection openings 4 and 5 of the connector socket 1. Five connection pins 6a to 6e and 7a to 7e are respectively located within the connection openings 4, 5 in the connector socket 1. The connection pins 6a to 6e and 7a to 7e are implanted at their lower ends onto a printed circuit board 8 secured to the opposite or rear side of the connector socket base 3, while their lower ends pass through the connector socket base 3. As seen in FIG. 3, corresponding pairs of connection pins 6a, 7a; 6b, 7b; . . . 6e, 7e are coupled to one another when a connector plug 2 is inserted into an opening 4, 5 of a connector socket 1. A resistor 9 is mounted on the printed circuit board 8 to act as an impedance for effecting the impedance matching between the connected terminals. In the embodiment of FIG. 3, one end of the resistor 9 is connected to the connection pins 6a and 7a and the other end of the resistor 9 is connected through switches 10 and 11 to the connection pins 6b and 7b. The switches 10 and 11 are mounted in such a fashion that their movable contacts protrude toward the interior of the connection openings 4 and 5 from the lower side walls of the connection openings 4 and 5. Only the switch 11 is seen in FIG. 3 as located in the connection opening 5; however, the switch 10 is correspondingly located in the connection opening 4. The switches 10 and 11 are shown in detail in FIGS. 6–10.

The switches 10 and 11 are each a normally-closed type switch which normally stays in an on state with its movable contact closed. Accordingly, when the connector plug 2 is inserted into either of the connection openings 4 or 5 of the connector socket 1, the top portion 2a of the connector plug 2 pushes the movable contact of the switch 10 or 11 to open the normally-closed contacts so that the switch 10 or 11 is turned off. When the switch 10 or 11 is turned off, the impedance matching resistor 9 is released or removed from the line between the connection pins 6a and 6b or 7a and 7b. Moreover, when the connector plug 2 is inserted into the connection opening 4 or 5 of the connector socket 1, the tapered portion 2b at the side wall of the connector plug 2 is engaged with a correspondinging engaging portion of the connector socket 1 to maintain the switch 10 or 11 in an OFF state.

As shown in FIG. 3, a flat cable 12 formed of a plurality of signal lines, for example, five signal lines, is provided. One end of the flat cable 12 is mounted on the printed circuit board 8 and coupled with the respective connection pins 6a to 6e and 7a to 7e of the connector socket 1. The other end of one flat cable is coupled to a circuit provided within the terminal to which the connector is secured. A similar or identical connection cable 13 using a flat cable is also provided to couple a plurality of terminals.

Figure 4:
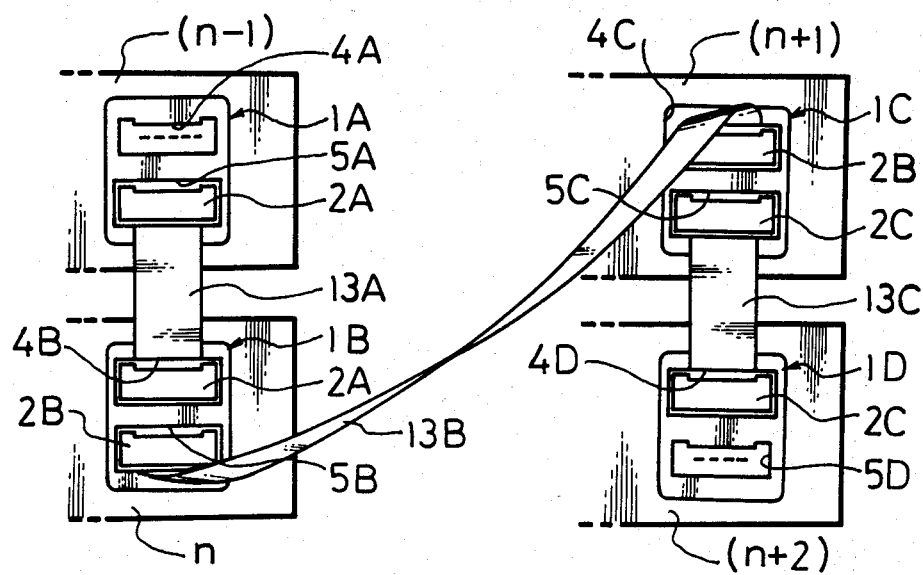
FIG. 4 is a schematic representation illustrating the connected state of the respective terminals shown in FIG. 2.

FIG. 4 illustrates the connection of the respective terminals (n−1) (n), (n+1) and (n+2). As FIG. 4 shows, a plurality of connector sockets 1A to 1D, for example, are respectively mounted on the slots of the first to fourth terminals (n−1), (n), (n+1) and (n+2). In FIG. 4, only a main portion of each terminal is illustrated. The connector plugs 2A are inserted into the lower connection opening 5A of the connector socket 1A and the upper connection opening 4B of the connector socket 1B. The connector plugs 2A are respectively coupled to each end of a flat cable 13A. Similarly, the connector plugs 2B are inserted into the lower connection opening 5B of the connector socket 1B and the upper connection opening 4C of the connector socket 1C. The connector plugs 2B are respectively coupled to each end of a flat cable 13B. Likewise, the connector plugs 2C are inserted into the lower connection opening 5C of the connector socket 1C and the upper connection opening 4D of the connector socket 1D. The plugs 2C are respectively coupled to each end of a flat cable 13C.

Consequently, the first to fourth terminals (n−1), (n), (n+1) and (n+2) are connected to one another to form a so-called multi-drop type bus line system. When so connected, the switch 10, 11 provided in each of the connection openings 4A to 4D into which the connector plug 2A to 2D is inserted is turned off and the resistors interposed in the predetermined transmission lines forming the bus line are cut off to release the interline impedance. However, the switch provided at the connection opening into which no connector plug is inserted stays on so that the interline impedance remains connected. More specifically, although the switch provided in the lower connection opening 5A of the connector socket 1A, the switches provided in the upper and lower connection openings 4B, 5B and 4C, 5C of the connector socket 1B and 1C, and the switch provided in the upper connection opening 4D of the connector socket 1D are each turned off to release the interline impedance, the switch provided in the upper connection opening 4A of the socket 1A and the switch provided in the lower connection opening 5D of the socket 1D stay on so that the interline impedance remains connected. As a result, the terminal of the bus line is substantially terminated by the interline impedance thereby to effect the impedance matching. Thus, a standing wave can be avoided from appearing and a problem such as a waveform distortion can be overcome.

Figure 5:
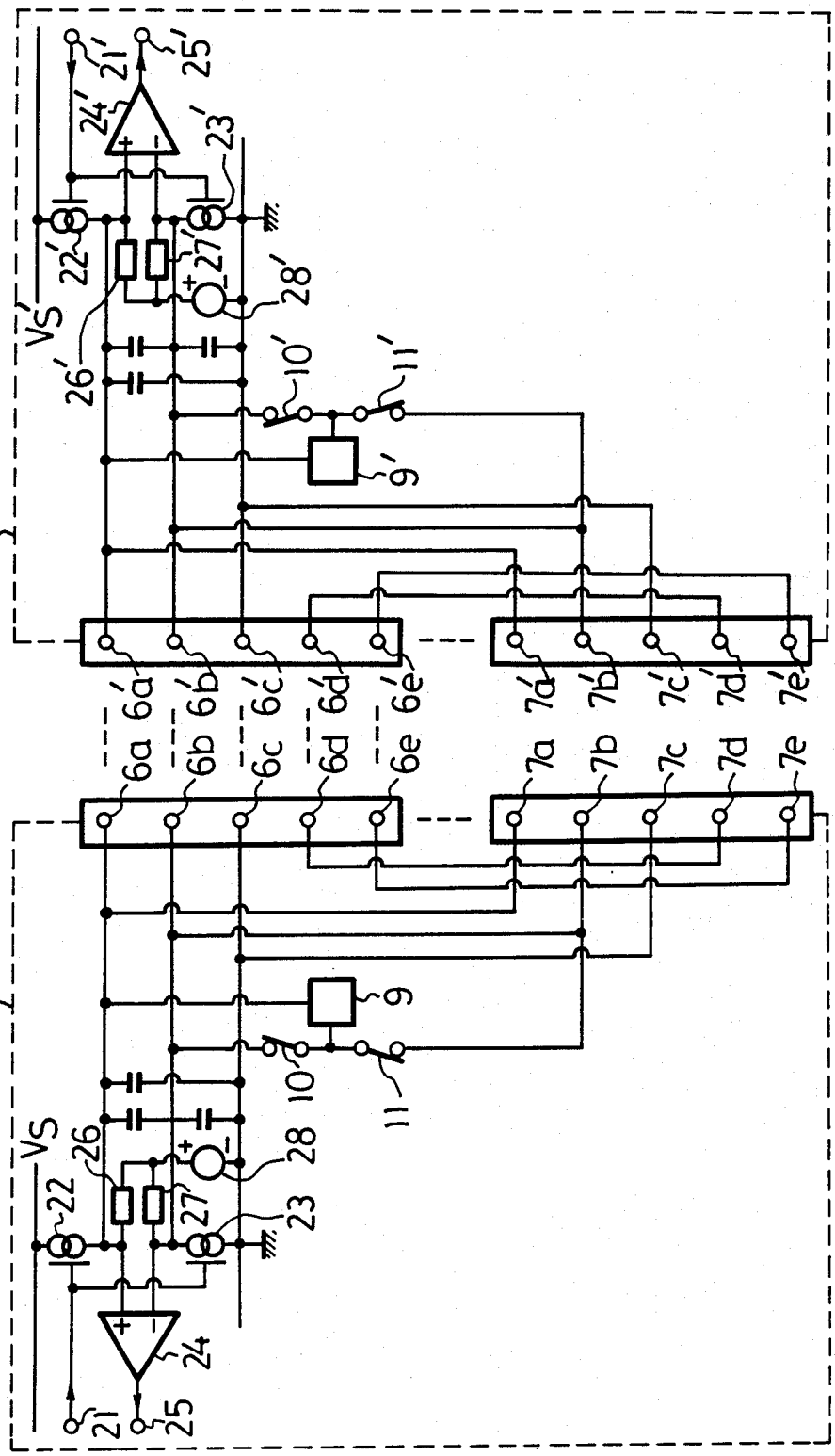
FIG. 5 is a block diagram illustrating an interface circuit which connects the connector secured to each terminal with an internal circuit.

FIG. 5 illustrates an arrangement of an interface circuit for each terminal which forms the multi-drop type bus line system of the present invention. In FIG. 5, like parts corresponding to those of FIG. 3 are marked with the same reference numerals and will not be described in detail.

Referring to FIG. 5, terminals 20 and 20' are representatively shown. The terminal 20 might be an apparatus such as a tuner, while the terminal 20' might be an apparatus such as a tape deck. In this embodiment, the arrangements of the interface circuits of the terminals 20 and 20' are exactly the same, so that in the terminal 20', like parts corresponding to those of the terminal 20 are marked with the same reference numerals but with primes and therefore need not be described in detail.

The connection pins 6a to 6e and 7a to 7e, the resistor 9 and the switches 10 and 11 are respectively connected with the above-mentioned connection relationships. The transmission lines of the connection pins 6a to 6e and 7a to 7e are used as lines through which control signals are transmitted and/or received. The transmission line of the connection pins 6c and 7c is used as an earth or ground line and the transmission lines of the connection pins 6d, 6e and 7d and 7e are used as, for example, power source lines or audio signal lines. Furthermore, the connection pins 6a to 6e and the connection pins 6a' to 6e' are coupled to one another by means of connection cables to enable the terminals 20 and 20' to interchange signals between them for communication. Furthermore, the respective connector sockets having the connection pins 7a to 7e and 7a' to 7e' are provided to connect other apparatuses.

An input terminal 21 is provided to receive a transmission command logic signal from, for example, a microcomputer. When a high-level signal, for example, a logic "1", from the input terminal 21 is supplied to current switches 22 and 23, the current switches 22 and 23 are each turned on to allow a voltage of a predetermined value, for example, more than 120 mV to be produced between the connection pins 6a and 6b. This voltage signal is supplied to the terminal 20' as a control signal. When the current switches 22 and 23 receive a low-level signal, for example, a logic "0", from the input terminal 21, the current switches 22 and 23 are turned off so that a voltage of predetermined value, for example, less than 20 mV is produced between the connection pins 6a and 6b. This voltage signal is supplied to the terminal 20' as a control signal.

Upon receipt of a high level signal, from the terminal 20', the voltage of predetermined value, for example, more than 120 mV, is applied between the connection pins 6a and 6b. Similarly, a low level voltage of predetermined value, for example, less than 20 mV is applied between the terminals 6a and 6b from the terminal 20'. These voltage signals are supplied to a differential amplifier 24 as control signals and output signals are developed at an output terminal 25. Resistors 26, 27 and a voltage source 28 are connected to the inputs of the differential amplifier 24 as shown to establish a bias condition at an intermediate value of a voltage produced across the impedance-matching resistor 9.

Since at this time the connector plug for coupling the respective terminals is inserted into the connector socket of the connection pins 6a to 6e, the switch 10 is turned off to release the resistor 9 from the line between the connector pins 6a to 6b. In this case, however, no connector plug is inserted into the connector socket of the connection pins 7a to 7e so that the switch 11 is turned on to connect the resistor 9 to the line between the connection pins 7a to 7b. The connection pins 7a to 7e and the connection pins 6a to 6e are coupled to one another so that the impedance-matching resistor 9 is also connected to the line between the connection pins 6a and 6b. As a result, the terminal end of the bus line is terminated, thus avoiding occurrences of standing waves and waveform distortion.

Figure 6A:
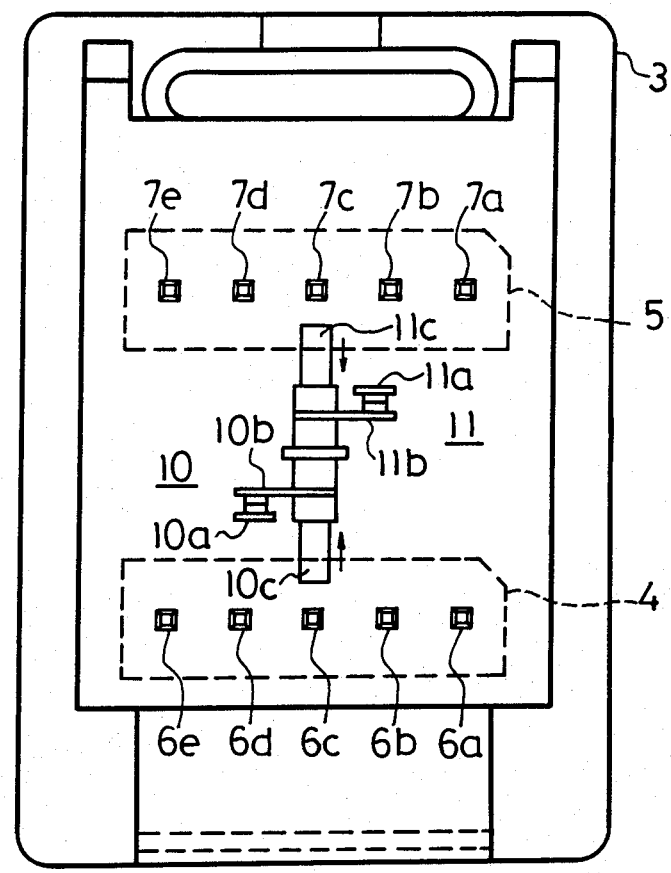
FIG. 6A is a rear view of a connector according to the invention, illustrating a first arrangement thereof.
Figure 6B:
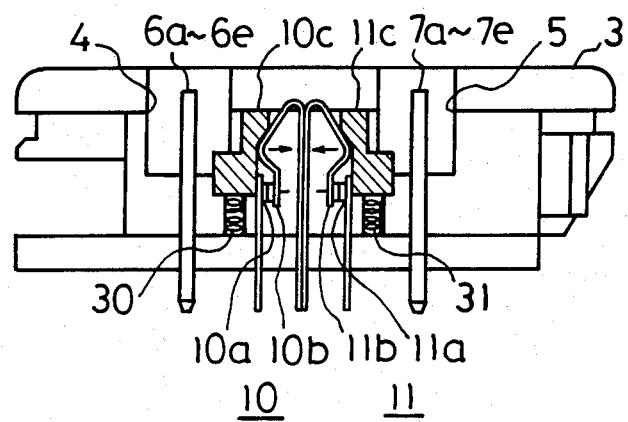
FIG. 6B is a cross-sectional view of the connector of FIG. 6A.

FIGS. 6A and 6B illustrate an arrangement of each of the switches 10 and 11 mounted to the connector socket base 3. In this case, the electrical connections of the connection pins 6a to 6e and 7a to 7e with circuits are not shown in FIGS. 6A and 6B. FIG. 6A is a rear view of the switches 10 and 11 mounted to the connector socket base 3, while FIG. 6B is a cross-sectional view thereof.

As FIGS. 6A and 6B show, the switch 10 comprises a fixed contact 10a, a movable contact 10b, and a slide member 10c. When the connector plug 2 shown in FIG. 3 is inserted into the connector opening 4, the top portion of the connector plug 2 pushes the camming portion slide member 10c of the switch 10 to move longitudinally in the direction shown by an arrow so that the movable contact 10b moves apart from the fixed contact 10a, thus turning the switch 10 off. In a like fashion, the switch 11 is formed of a fixed contact 11a, a movable contact 11b and a slide member 11c. When the connector plug 2 shown in FIG. 3 is inserted into the connection opening 5, the top portion of the connector plug 2 pushes the slide member 11c of the switch 11 to move in the direction shown by an arrow so that the movable contact 11b is detached from the fixed contact 11a. Thus, the switch 11 is turned off. The respective slide members 10c and 11c are urged upwardly in FIG. 6B by the spring forces of springs 30 and 31.

Figure 7A:
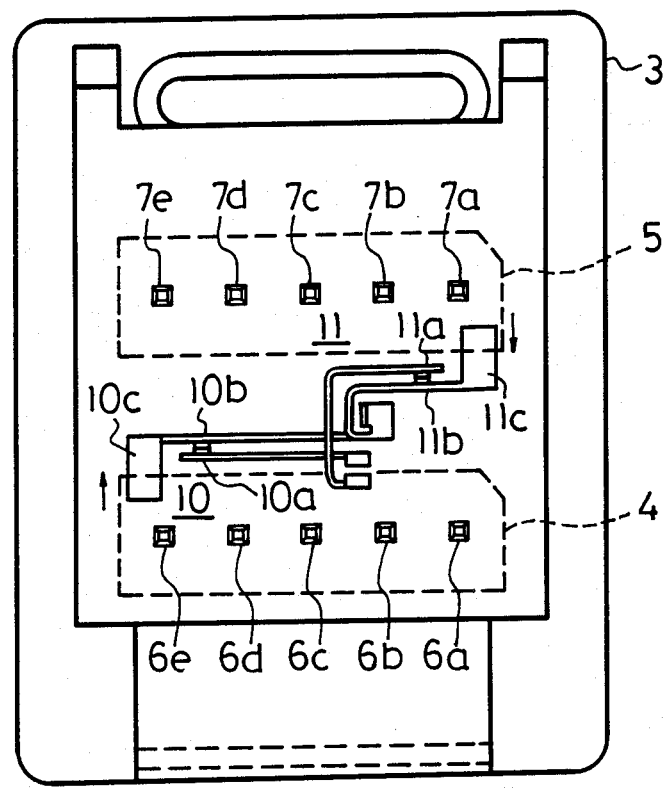
FIG. 7A is a rear view of the connector according to the invention, illustrating a second arrangement thereof.
Figure 7B:
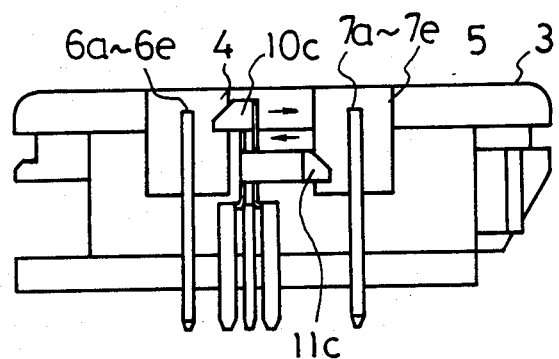
FIG. 7B is a cross-sectional view of the connector of FIG. 7A.

FIGS. 7A and 7B illustrate another embodiment of the switches 10 and 11 mounted to the rear side of the connector socket base 3. FIG. 7A is a rear view of the switches 10 and 11 mounted on the rear side of the socket base 3 and FIG. 7B is a cross-sectional view thereof. In FIGS. 7A and 7B, like parts corresponding to those of FIGS. 6A and 6B are marked with the same reference numerals and therefore need not be described in detail.

Referring to FIGS. 7A and 7B, the switch 10 comprises a fixed contact 10a, a movable contact 10b, an a slide member 10c. When the connector plug 2 shown in FIG. 3 is inserted into the connection opening 4, the top portion of the connector plug 2 pushes the slide member 10c to move laterally in the direction shown by an arrow so that the movable contact 10b moves away from contact with the fixed contact 10a, thus turning the switch 10 off. Similarly, the switch 11 comprises a fixed contact 11a, a movable contact 11b and a slide member 11c. When the connector plug 2 shown in FIG. 3 is inserted into the connection opening 5, the top portion of the connector plug 2 pushes the slide member 11c to move in the direction shown by an arrow so that the movable contact 11b moves away from contact with the fixed contact 11a, thus turning the switch 11 off.

Figure 8:
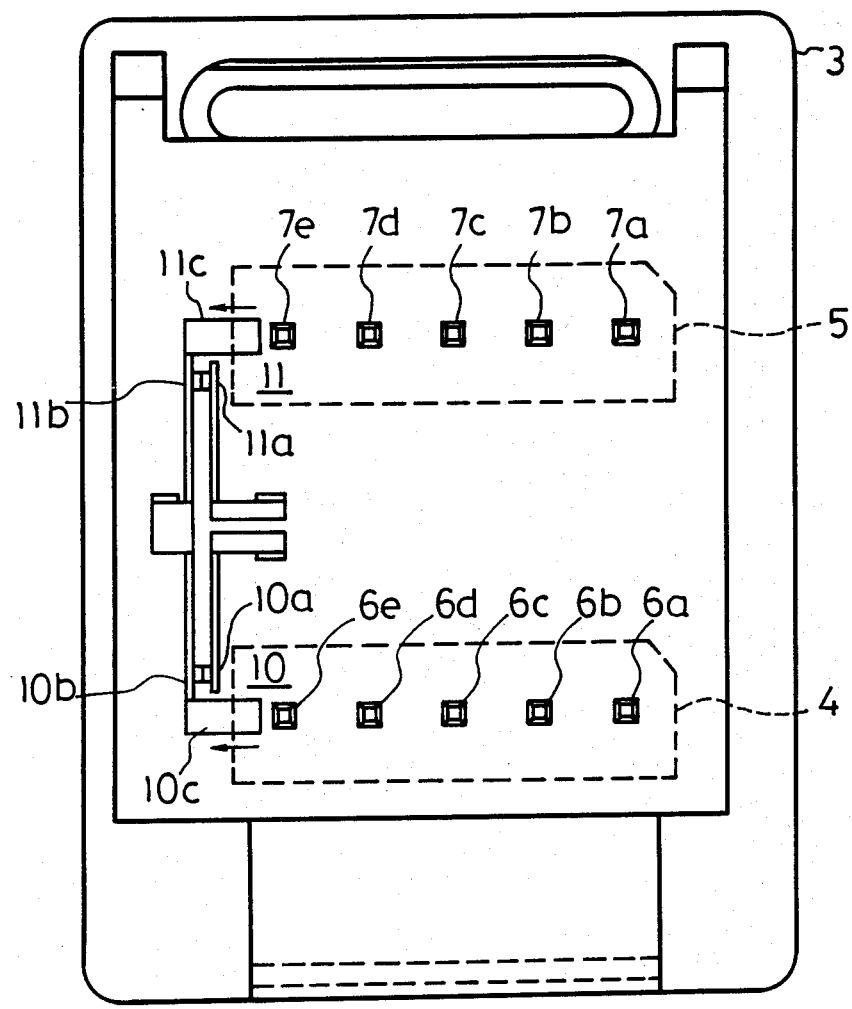
FIG. 8 is a rear view of the connector according to the invention, illustrating a third embodiment thereof.

FIG. 8 illustrates another embodiment of the switches 10 and 11 mounted on the rear side of the connector socket base 3. FIG. 8 is a rear view of the switches 10 and 11 secured to the rear side of the connector socket base 3. In FIG. 8, like parts corresponding to those of FIGS. 6A, 6B and FIGS. 7A, 7B are marked with the same reference numerals and will not be described in detail.

As shown in FIG. 8, the switch 10 comprises the fixed contact 10a, the movable contact 10b, and the slide member 10c. When the connector plug 2 shown in FIG. 3 is inserted into the connector opening 4, the top portion of the connector plug 2 pushes the slide member 10c to move laterally in the direction shown by an arrow so that the movable contact 10b moves away from contact with the fixed contact 10a, thus turning the switch 10 off. Likewise, the switch 11 comprises the fixed contact 11a, the movable contact 11b, and the slide member 11c. When the connector plug 2 shown in FIG. 3 is inserted into the connection opening 5, the top portion of the connector plug 2 pushes the slide member 11c to slide laterally in the direction shown by an arrow so that the movable contact 11b moves to detach from the fixed contact 11a, thus turning the switch 11 off.

Figure 9:
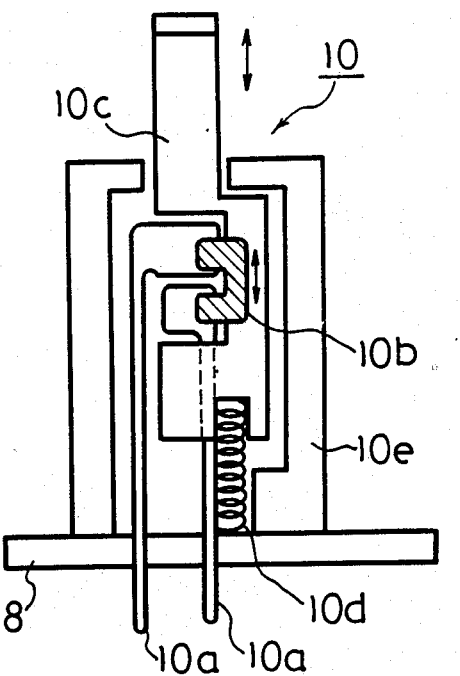
FIG. 9 is an illustration of an arrangement of a push-type or slide-type switch.

FIG. 9 schematically illustrates still another embodiment of the switches 10 and 11, in which the switch 10 or 11 is of a push-type or slide-type. FIG. 9 illustrates only the arrangement of the switch 10 for simplifying the description.

Referring to FIG. 9, the switch 10, for example, is implanted on the printed circuit board 8. The switch 10 comprises at its tip end a pair of fixed contacts 10a which are spaced apart from each other by a predetermined gap or spacing therebetween. The movable contact 10b is engaged with the gap portion between the pair of fixed contacts 10a and is movable in the direction shown by arrows. The slide member 10c is fixed with the movable contact 10b and is freely slidable in the longitudinal direction shown by arrows when the connector plug is inserted into or detached from the connection opening. A coil spring 10d is tensioned between the slide member 10c and the printed circuit board 8 and a housing 10e. The slide member 10c (11c) is so mounted that it can freely slide in the same direction as the extending direction of the connection pins 6a to 6e (7a to 7e), as illustrated in FIG. 10.

When the connector plug is not inserted into the connector socket, the spring force of the coil spring 10d urges the slide member 10c to move longitudinally upwardly as seen in the drawing, whereby the movable member 10b moves across the gap or clearance of the pair of fixed contacts 10a to short-circuit the pair of fixed contacts 10a, thus turning the switch 10 on. Conversely, under the state that the connector plug is inserted into the connector socket, the top portion of the connector plug urges the slide member 10c to move longitudinally downwardly as seen in the drawing against the spring force of the coil spring 10d, whereby the movable contact 10b passes over the gap portion between the pair of fixed contacts 10a to disconnect the fixed contacts 10a, thus turning the switch 10 off.

Figure 10:
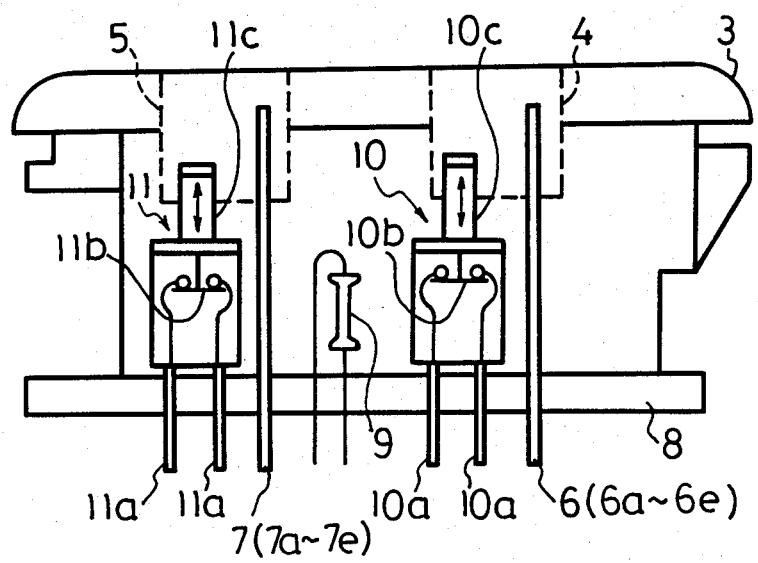
FIG. 10 is a schematic representation of a fourth arrangement of a connector according to the invention to which the switch in FIG. 9 is applied.

FIG. 10 diagrammatically illustrates the switch constructed as shown in FIG. 9 as assembled into the connector socket. In FIG. 10, like parts corresponding to those of FIG. 9 are marked with the same reference numerals and will not be described in detail.

As shown in FIG. 10, under the conditions that the connector plug is not inserted into the connection opening 4 (or 5) of the connector socket 3, the slide member 10c (or 11c) is urged longitudinally upwardly in the direction of the arrows by the spring force of the coil spring (not shown). In this state, the fixed contacts 10a (or 11a) and the movable contact 10b (or 11b) contact each other to turn the switch 10 (or 11) on so that the resistor 9 is connected to the transmission line of the connection pin 6 (or 7). On the other hand, when the connector plug is inserted into the connection opening 4 (or 5), the top portion of the connector plug urges the slide member 10c (or 11c) longitudinally downwardly in the direction of the arrow against the biasing force of the coil spring (not shown), whereby the movable contact 10b (or 11b) is detached from the fixed contacts 10a (or 11a) to turn the switch 10 (or 11) off, thus releasing the resistor 9 from the transmission line of the connection pin 6 (or 7).

The above description is presented by way of example on the preferred embodiments of the invention and it will be apparent that many modifications and variations thereof could be effected by one with ordinary skill in the art without departing from the spirit or scope of the novel concepts of the invention so that the scope of the invention should be determined only by the appended claims.

We claim:

1. A multi-drop type bus line system comprising:
   (a) a plurality of terminals, each of said terminals including at least first and second connectors, each of said first and second connectors including a plurality of connection pins arranged so that corresponding connection pins of said first and second connectors are electrically connected to each other and said connection pins are respectively electrically connected to a circuit provided within each of said plurality of terminals;
   (b) connection cable means for coupling a connector of one terminal to a connector of another terminal so as to enable signal transmission between the terminals;
   (c) switching means provided in said connector of each terminal and being operated each time said connection cable means is coupled to said connector;

(d) interline impedance means connected between predetermined connection pins of said first and second connectors; and (e) means for removing said interline impedance means when said connection cable means is coupled to said connector by operation of said switching means, thereby impedance matching between a bus line and a terminal is improved.

2. The bus line system as set forth in claim 1, wherein said impedance removing means comprises a portion of a connector coacting with said switching means for changing the ON/OFF state of said switching means to remove said interline impedance means.

3. The bus line system as set forth in claim 1, wherein said impedance means is a resistor, said switching means disconnecting said resistor when said connection cable means is coupled to said connector.

4. The system as set forth in claim 1 wherein at least one of said first and said second connectors includes a connector socket having a printed circuit board in circuit with other ends of said connector pins.

5. The bus line system as set forth in claim 1, wherein said switching means comprises a pair of contacts normally in a first contacting ON/OFF state, and a movable member for actuating said contacts to an opposite ON/OFF state, said movable member being moved by said connection cable means when inserted into said connector.

6. The system as set forth in claim 5, wherein said movable member is a slide member which, when pushed by a connector plug of said cable means, changes said ON/OFF state of said pair of contacts.

7. The system as set forth in claim 5, wherein said pair of contacts are fixed and said movable member contacts said pair of contacts to determine an ON/OFF state of said switch.

8. An apparatus for constructing a multi-drop type bus line system comprising:

(a) a plurality of apparatuses, each having first and second connectors, each of said first and second connectors having a predetermined number of connection pins, corresponding connection pins of said first and second connectors being electrically connected and said connection pins being electrically connected to a circuit provided within each of said plurality of apparatuses;

(b) connection cable means for coupling the connector of one apparatus to the connector of another apparatus;

(c) switching means provided in said connector of each apparatus and being actuated each time said connection cable means is coupled to said connector;

(d) interline impedance means connected between predetermined connection pins of said first and second connectors; and (e) means for releasing said interline impedance means when said connection cable means is coupled to said connector, wherein said apparatuses are coupled through said connection cable means to form said multi-drop type bus line system and impedance matching is effected at a terminated portion of said bus line.

9. The bus line system as set forth in claim 8, wherein said impedance changing means comprises a portion of a connector coacting with said switching means for changing the ON/OFF state of said switching means to change said interline impedance means.

10. The bus line system as set forth in claim 8, wherein said impedance means is a resistor, said switching means disconnecting said resistor when said connection cable means is coupled to said connector.

11. The apparatus as set forth in claim 8 wherein at least one of said first and second connectors includes a connector socket having a printed circuit board in circuit with other ends of said connector pins.

12. The bus line system as set forth in claim 8, wherein said switching means comprises a pair of contacts normally in a first contacting ON/OFF state, and a movable member for actuating said contacts to an opposite ON/OFF state, said movable member being moved by said connection cable means when inserted into said connector.

13. The system as set forth in claim 12, wherein said movable member is a slide member which, when pushed by a connector plug of said cable means, changes said ON/OFF state of said pair of contacts.

14. The system as set forth in claim 12, wherein said pair of contacts are fixed and said movable member contacts said pair of contacts to determine an ON/OFF state of said switch.

15. A connector comprising:
(a) a predetermined plurality of connection pins;
(b) a switch which is operated each time a connection cable for coupling said connector to another connector is inserted into said connector;
(c) interline impedance means connected between predetermined connection pins of said connector;
(d) means coacting with said switch for releasing said interline impedance means by the action of said switch when said connection cable is inserted into said connector; and
(e) a connector socket having a connection opening for receiving said connection cable in a connecting relationship with one end of said connection pins, and a connector socket base having a printed circuit board in circuit with other ends of said connector pins.

16. A connector as set forth in claim 15, further including a connection cable having a plurality of conductors respectively connected to said connection pins.

17. A connector as set forth in claim 15, wherein said interline impedance means is a resistor.

18. The bus line system as set forth in claim 15, wherein said impedance means is a resistor, said switch disconnecting said resistor when said connection cable is coupled to said connector.

19. The bus line system as set forth in claim 15, wherein said switch comprises a pair of contacts normally in a first contacting ON/OFF state, and a movable member for actuating said contacts to an opposite ON/OFF state, said movable member being moved by said connection cable when inserted into said connector.

20. The system as set forth in claim 19, wherein said movable member is a slide member which, when pushed by a connector plug of said connection cable changes said ON/OFF state of said pair of contacts.

21. The system as set forth in claim 19, wherein a pair of contacts are fixed and said movable member contacts said pair of contacts to determine an ON/OFF state of said switch.

* * * * *